United States Patent
Kreutzer

(10) Patent No.: US 6,736,403 B2
(45) Date of Patent: May 18, 2004

(54) ROTARY SHAFT SEAL WITH TWO SEALING LIPS

(75) Inventor: Siegmar Kreutzer, Onionsingel (NL)

(73) Assignee: VR Dichtungen GmbH, Ubach-Palenberg (DE)

( * ) Notice: Subject to any disclaimer, the term of this patent is extended or adjusted under 35 U.S.C. 154(b) by 0 days.

(21) Appl. No.: 10/204,398

(22) PCT Filed: Dec. 19, 2001

(86) PCT No.: PCT/DE01/04775
§ 371 (c)(1),
(2), (4) Date: Aug. 22, 2002

(87) PCT Pub. No.: WO02/052180
PCT Pub. Date: Jul. 4, 2002

(65) Prior Publication Data
US 2003/0111800 A1 Jun. 19, 2003

(30) Foreign Application Priority Data
Dec. 22, 2000 (DE) ..................... 200 21 808 U

(51) Int. Cl.[7] ................................. F16J 15/32
(52) U.S. Cl. .............. 277/551; 277/562; 277/572; 277/576
(58) Field of Search ................. 277/371, 551, 277/562, 565, 572, 573, 577, 576

(56) References Cited

U.S. PATENT DOCUMENTS

| | | | | |
|---|---|---|---|---|
| 2,177,441 A | * | 10/1939 | Pesarese | 277/563 |
| 2,838,333 A | * | 6/1958 | Wilder et al. | 277/575 |
| 4,226,426 A | * | 10/1980 | Messenger | 277/353 |
| 4,550,920 A | * | 11/1985 | Matsushima | 277/559 |
| 4,623,153 A | | 11/1986 | Nagasawa | 277/152 |
| 5,421,591 A | * | 6/1995 | Katzensteiner | 277/550 |
| 5,456,475 A | * | 10/1995 | Abraham et al. | 210/171 |
| 6,102,409 A | * | 8/2000 | Furuyama et al. | 277/562 |
| 6,123,514 A | * | 9/2000 | Kawaguchi et al. | 417/222.2 |
| 6,196,551 B1 | * | 3/2001 | Zellers | 277/402 |
| 6,357,751 B1 | * | 3/2002 | Rentschler | 277/353 |
| 6,401,322 B1 | * | 6/2002 | Matsushima | 29/460 |
| 6,565,096 B2 | * | 5/2003 | Ikeda et al. | 277/551 |

FOREIGN PATENT DOCUMENTS

| | | | |
|---|---|---|---|
| DE | 1 475 572 | | 1/1969 |
| DE | 88 12 628 | | 1/1989 |
| DE | 3929065 | * | 3/1991 |
| DE | 197 40 822 | | 3/1999 |
| DE | 10058826 | * | 6/2002 |
| EP | 0 706 001 | | 4/1996 |
| EP | 1 132 665 | | 9/2001 |
| EP | 1 134 465 | | 9/2001 |
| EP | 1 134 466 | | 9/2001 |

* cited by examiner

*Primary Examiner*—Anthony Knight
*Assistant Examiner*—Alison K. Pickard
(74) *Attorney, Agent, or Firm*—Grossman Tucker Perreault & Pfleger, PLLC

(57) ABSTRACT

In a known rotary shaft seal with two sealing lips, a first diaphragm body (20) with a first sealing lip (21) is mounted on a support element (22) and inserted in a second diaphragm body (23) with a second sealing lip (27) that rests against a pressure mount (24) and is mounted in the bearing mount (1). The object of the invention is to prevent the pressure medium from passing through the gap (26) between the two diaphragm bodies, which is open towards the pressure side, and ensure that the first diaphragm body can be displaced in the second along this gap. According to the invention, the first diaphragm body (2) is mounted on a support element (3) and inserted from the unpressurized side into the second diaphragm body (4), which serves to mount the seal in the bearing mount (1), reaches around a pressure mount (5) on the unpressurized side and secures it against axial movement. The rotary shaft seal according to the invention can be used to seal shaft openings leading into vessels containing a pressurized fluid medium, particularly water pumps for internal combustion engines in motor vehicles.

20 Claims, 3 Drawing Sheets

ROTARY SHAFT SEAL WITH TWO SEALING LIPS

FIELD OF THE INVENTION

The invention relates to a rotary shaft seal with two diaphragm bodies that are mounted on a support element and display separated sealing diaphragms with sealing lips, which rest against the shaft to be sealed.

BACKGROUND

Shaft sealing systems involving rotary shaft seals, in which the sealing lip of a sealing diaphragm is inclined against the pressure direction and rests against the shaft to be sealed, are known from EP-A1-07 06 001, for example. Two sealing diaphragms are frequently combined in a sealing system, e.g. when a reserve seal is desired for the event that the first seal fails, e.g. due to particles getting caught between the sealing lip and the shaft. Instead of merely providing a series of simple systems, integrated systems with two sealing diaphragms have also been proposed to achieve a small height. A system of this kind is described in the above European patent application. In this case, a first sealing diaphragm of a first diaphragm body is supported by a pressure mount and a second diaphragm body containing a support element is inserted from the pressure side into the first diaphragm body (see FIG. 2).

A disadvantage of this arrangement is that a gap exists on the pressure side between the first, outside diaphragm body and the second, inside diaphragm body, which can open to form ducts under the effect of the pressurized fluid, thus eliminating the sealing effect of the second sealing diaphragm. This problem becomes particularly serious when particles penetrate the ducts and stabilise them.

The object of the invention is to disclose a rotary shaft seal with two sealing lips that does not display this disadvantage.

The object is solved by a rotary shaft seal as defined in the main claim.

SUMMARY

In the seal according to the invention, the gap between the first, inside diaphragm body and the second, outside diaphragm body is covered on the pressure side by the second sealing diaphragm and sealed by the pressure acting on it. Fluids or particles can no longer penetrate the gap.

The support element is preferably designed as an angle ring, whose radial leg faces the second sealing diaphragm and supports it.

The pressure mount also acts as a locking ring by holding the inside parts of the seal in the second, outside diaphragm body. It is preferably of disk-shaped design.

Support element and pressure mount are made of a solid material, such as a metal like steel or special steel.

The diaphragm bodies are preferably made of an elastic material, such as an elastomeric plastic. Particularly suitable are: fluoroelastomers, such as VITON (ISO code FPM), and nitrile rubber, which can be hydrogenated if necessary, such as THERBAN (ISO code HNBR). These elastomers can be cross-linked by the usual methods, such as sulphur or peroxide vulcanization.

The elastomeric material of the sealing diaphragms with the sealing lips, possibly also the entire diaphragm body, preferably contains particles of a lubricating solid. Particularly preferable for this purpose are graphite and polytetrafluoroethylene (PTFE).

The space between the two sealing diaphragms is advantageously filled with a lubricant. This can serve as permanent lubrication, if the fluid medium on the pressure side does not have a lubricating effect, or as emergency lubrication in the event of dry-running.

In a preferred embodiment, a third diaphragm body is provided inside the first diaphragm body and has a sealing diaphragm, whose sealing lip is in contact with the shaft and inclined away from the pressure direction. This diaphragm body seals the container for the fluid medium to be sealed against outside atmospheric pressure when a vacuum prevails in the container, as can be the case (typically 2 to 20 hPa) when filling with medium for the first time. Due to their inclined position, the first and second sealing lips are lifted off the shaft by the outside atmospheric pressure in this case and allow the outside air to enter the container, meaning that filling, e.g. by suction, is prevented or at least greatly delayed.

The sealing diaphragm of the third diaphragm body preferably rests axially against the side of the support element facing away from the pressure. In order to prevent axial shifting in the unpressurised state, the sealing diaphragm of the third diaphragm body is advantageously angled on the outer, radial edge to form an axial leg, which rests against the pressure side of the first diaphragm body. For the purpose of radial mounting, the axial leg is expediently fitted into the first diaphragm body, or possibly in the axial leg of the support element.

The sealing lip of the third diaphragm body is advantageously dimensioned such that it rests against the shaft without pressure. This prevents the third diaphragm body from contributing to the power dissipation caused by friction during operation under pressure.

The third diaphragm body can be made of the same materials as specified above for the first and second diaphragm bodies. However, as it only rests against the shaft under pressure during filling while the shaft is stationary, the material does not need to contain any lubricating solid particles. Simple nitrile-butadiene rubber (NBR) is suitable, for example.

One advantage of the rotary shaft seal according to the invention is that, during assembly, the inside parts can all be inserted into the second, outside diaphragm body from one side, i.e. the unpressurised side. This also applies to the third diaphragm body, if appropriate. This facilitates manufacturing. In the known seal according to FIG. 2, this is not possible due to the T-profile of the outer diaphragm body.

Another advantage in the assembly of the seal according to the invention is that it remains intact when pressed into the bearing mount under axial pressure. The axial pressure is necessary, because the elastic, second diaphragm body is slightly oversized and is secured in the bearing mount by means of a press fit. In the known seal (FIG. 2), the pressure-side diaphragm body can move axially in the other diaphragm body prior to assembly. This poses the risk of it getting caught on the shaft and shifting against the other diaphragm body, so that the seal falls apart or exceeds the specified axial dimensions. The diaphragm body on the pressure side is, at the least, no longer fixed in place and the pressurised medium can pass through the gap between the diaphragm bodies more easily.

The rotary shaft seal according to the invention can be used to seal shaft openings leading into vessels containing a pressurised fluid medium. It is particularly suitable for sealing shafts on water pumps, especially for internal combustion engines in motor vehicles.

BRIEF DESCRIPTION OF THE DRAWINGS

The invention is explained in more detail based on the preferred embodiment shown in the enclosed FIG. 1.

DETAILED DESCRIPTION OF THE INVENTION

Figure 1:
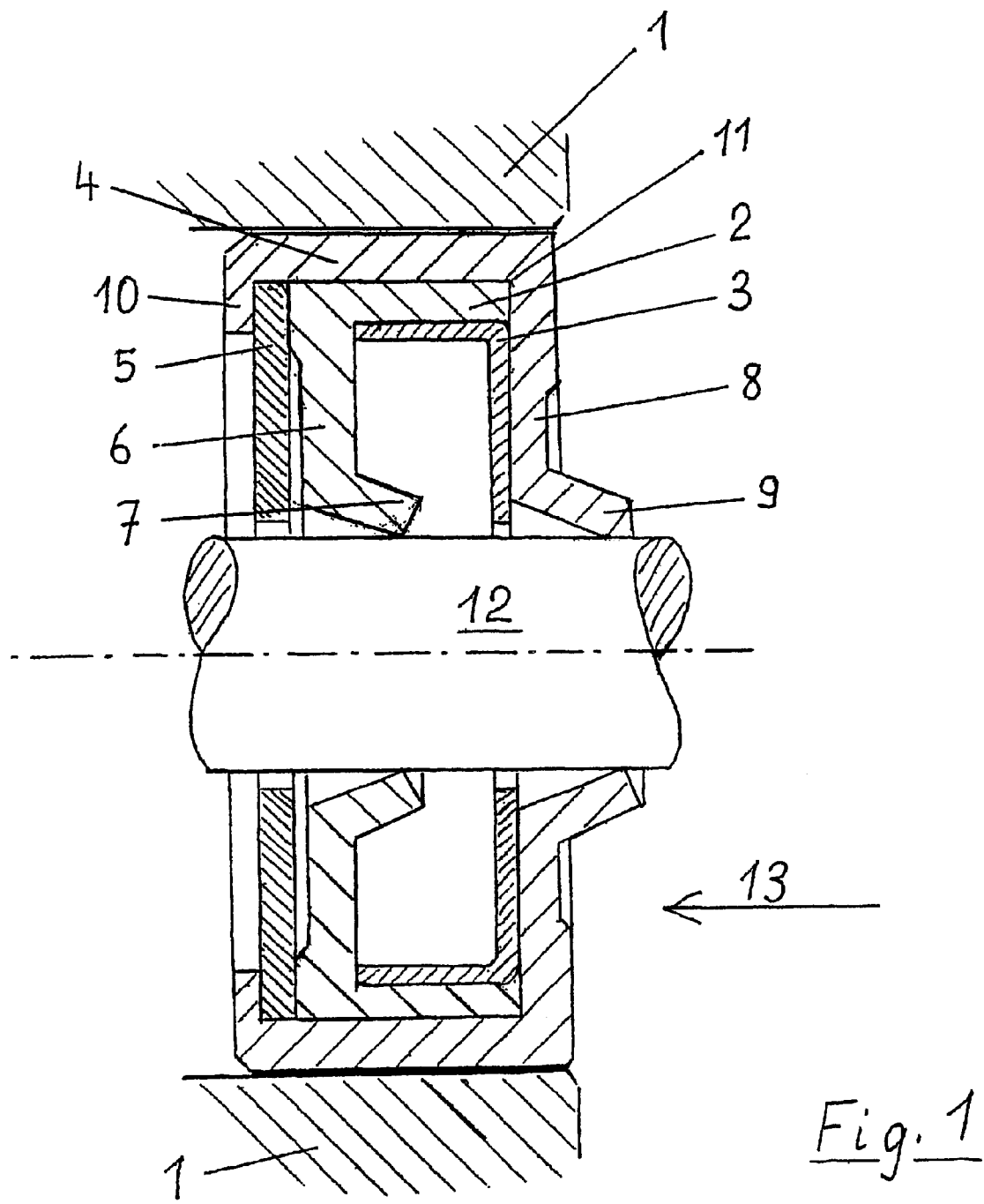

FIG. 1 shows a rotary shaft seal according to the invention, which is installed in the bearing mount for a shaft opening in the wall of a vessel that is filled with a pressurised fluid medium during operation, e.g. cooling water. The pressure of the medium acts on the seal in the direction of arrow 13, while the opposite side of the seal is usually in contact with the outside air.

A first diaphragm body 2 made of an elastomeric material is mounted on a support element 3, which is in the form of an angle ring. Integrally moulded on first diaphragm body 2 is a first sealing diaphragm 6 with a first sealing lip 7, which rests tightly against shaft 12 and is inclined against the pressure direction. A second sealing diaphragm 8 with a second sealing lip 9, likewise inclined against the pressure direction and resting against the shaft, is integrally moulded on the pressure side of second diaphragm body 4, which surrounds first diaphragm body 2 and support element 3 inserted in it. Pressure mount 5, which has the form of a perforated disk, is positioned on first diaphragm body 3 on the unpressurised side. Pressure mount 5 is held in place axially on the unpressurised side by inward-facing, encompassing edge 10 of the second diaphragm body. The entire arrangement is inserted in bearing mount 1, where the sufficiently oversized dimensions of the elastomeric material of second diaphragm body 4 ensure a tight press-fit. Gap 11 between the first and second diaphragm bodies is entirely covered by second sealing diaphragm 8.

Figure 2:
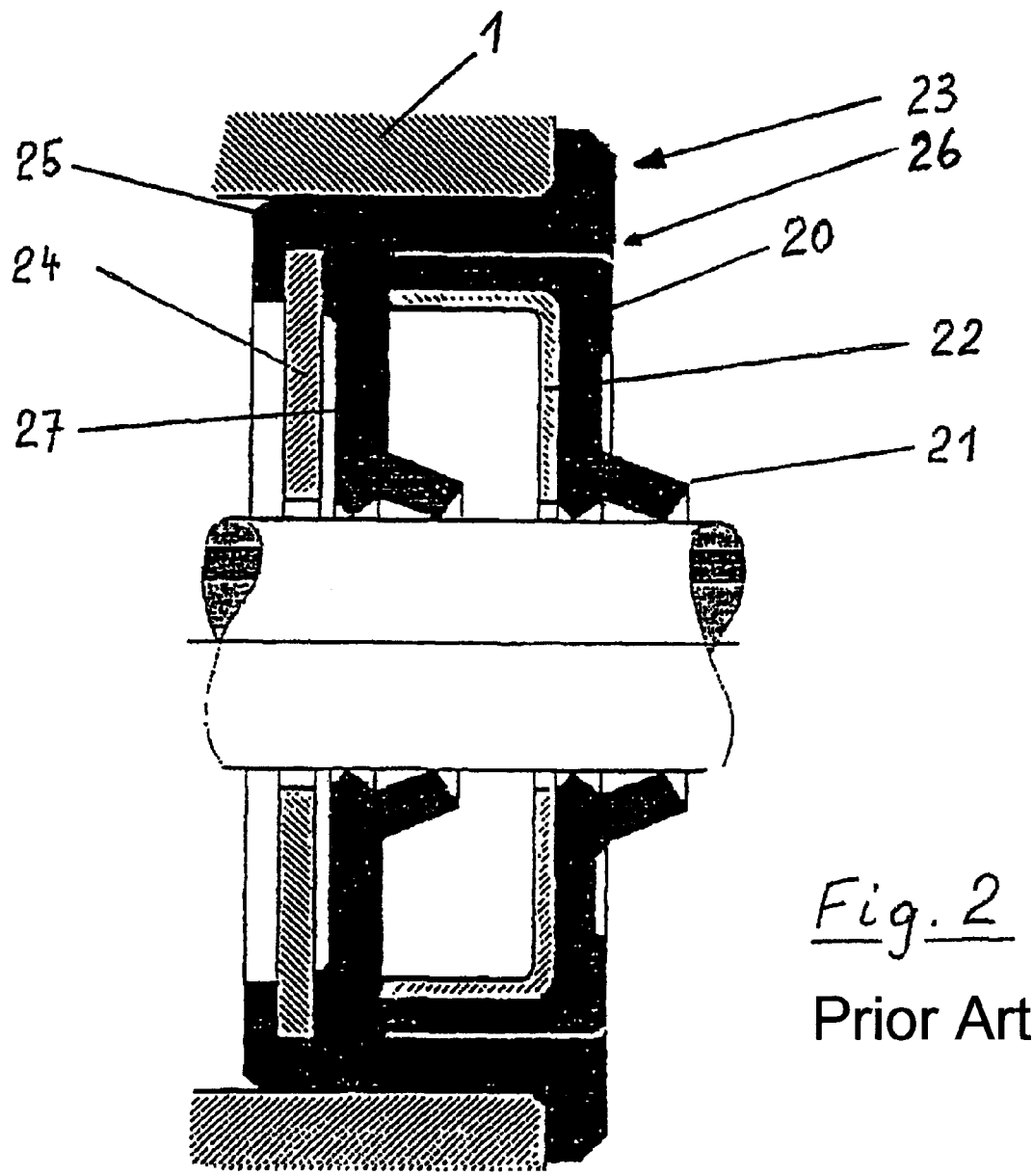
FIG. 2 shows a rotary shaft seal according to the prior art described above.

In FIG. 2, first diaphragm body 20 with a first sealing lip 21 is mounted on support element 22 and inserted in second diaphragm body 23. The latter has a T-shaped profile and extends at the end of the support element into a second sealing diaphragm with sealing lip 27. In order to support the second sealing diaphragm, a pressure mount 24 is provided on the unpressurised side, which is held in place axially by encompassing edge 25 of the second diaphragm body. Between the first and second diaphragm bodies is a gap 26, which is open towards the pressure side. It can also be seen that, with this arrangement, the first diaphragm body must be inserted in the second diaphragm body from the pressure side, while the pressure mount can only be fitted from the other side. Moreover, diaphragm body 20 can move in diaphragm body 23 as long as it is not pressed into the bearing mount.

Figure 3:
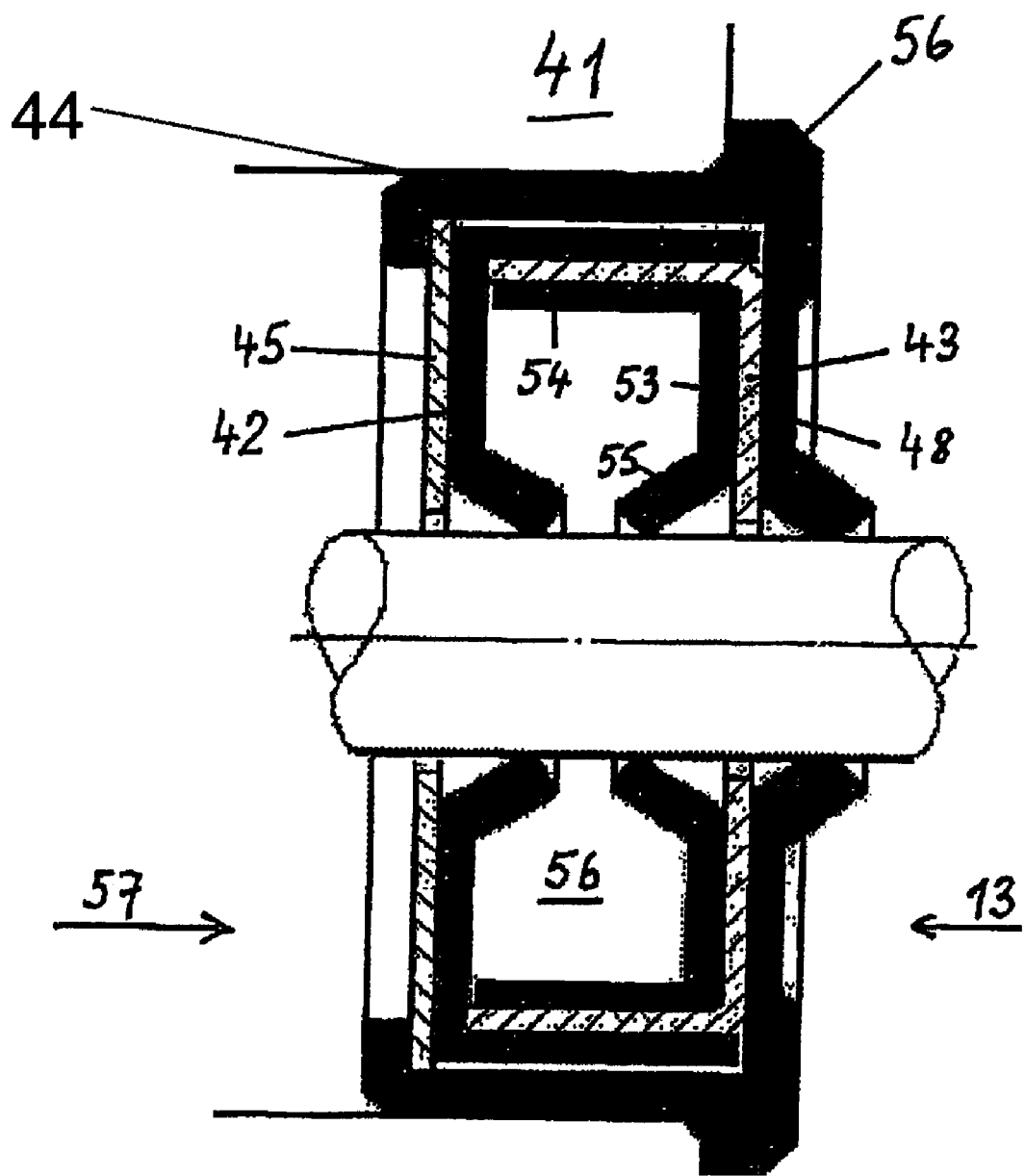
FIG. 3 shows a preferred embodiment.

FIG. 3 shows a preferred embodiment of the seal according to the invention with a third diaphragm body. First diaphragm body 42 is again inserted in second diaphragm body 44 and supported axially on the unpressurised side by pressure mount 45. The second diaphragm body has a radial, outside bead 56, which provides further axial support on bearing mount 41 in addition to the press-fit. Of course, a bead of this kind can also be provided in other embodiments. The diaphragm of the second diaphragm body rests against the pressure side of support element 43 and is thus supported. Support element 43 is an angle ring, the axial leg of which rests against the inside of first diaphragm body 42. Third diaphragm body 53 also has the shape of an angle ring and rests against the unpressurised inside of support element 43. Its axial leg extends to first diaphragm body 42. As a result, axial movement of the third diaphragm body in interior space 56 is not possible. The inside edge of the radial leg of the third diaphragm body is inclined against the unpressurised side and forms a sealing lip 55, which is in contact with shaft 52. This sealing lip is dimensioned such that it does not exert any pressure on the shaft, meaning that no friction force is generated when the shaft rotates. However, if a vacuum is present on the side of second sealing diaphragm 48 on the inside of the pump housing to be sealed when the pressurised medium is being filled while the shaft is stationary, atmospheric pressure 57 entering under the sealing lip of the first diaphragm body presses sealing lip 55 tightly against the shaft. Interior space 56 of the seal is filled with lubricating grease.

| | List of reference numbers |
|---|---|
| 1 | Bearing mount |
| 2 | First diaphragm body |
| 3 | Support element |
| 4 | Second diaphragm body |
| 5 | Pressure mount |
| 6 | First sealing diaphragm |
| 7 | First sealing lip |
| 8 | Second sealing diaphragm |
| 9 | Second sealing lip |
| 10 | Edge |
| 11 | Gap |
| 12 | Shaft |
| 13 | Direction of pressure in the vessel |
| 20 | First diaphragm body |
| 21 | First sealing lip |
| 22 | Support element |
| 23 | Second diaphragm body |
| 24 | Pressure mount |
| 25 | Edge |
| 26 | Gap |
| 27 | Second sealing diaphragm |
| 41 | Bearing mount |
| 42 | First diaphragm body |
| 43 | Support element |
| 44 | Second diaphragm body |
| 45 | Pressure mount |
| 48 | Second sealing diaphragm |
| 52 | Shaft |
| 53 | Radial leg of the third diaphragm body |
| 54 | Axial leg of the third diaphragm body |
| 55 | Sealing lip of the third diaphragm body |
| 56 | Interior space of the seal |
| 57 | Pressure of the outside air |

What is claimed is:

1. Rotary shaft seal with a first diaphragm body, which has a first sealing diaphragm with a first sealing lip that is in tight contact with a shaft and inclined against the pressure direction, and which is mounted on a generally axially extending portion of a support element and supported on the unpressurised side by a pressure mount, and a second diaphragm body, which has a second sealing diaphragm that is located at a distance from the first sealing diaphragm in the pressure direction and has a second sealing lip resting against the shaft and inclined against the pressure direction, and into which are inserted the support element with the first diaphragm body, as well as the pressure mount on the unpressurised side, where the support element supports the second sealing diaphragm and the pressure mount is held in place axially between the first diaphragm body and the inward-facing encompassing edge of the second diaphragm body, characterised in that the support element is designed as an angle ring, whose radial leg faces the second sealing diaphragm.

2. Rotary shaft seal according to claim 1 characterised in that the pressure mount is of disk-shaped design.

3. Rotary shaft seal according to claim 1 characterised in that the first and/or second sealing diaphragm is made of an elastomeric material containing particles of a lubricating solid.

4. Rotary shaft seal according to claim 3, characterised in that the particles consist of graphite or PTFE.

5. Rotary shaft seal according to claim 1 characterised in that the space between the two sealing diaphragms is filled with a lubricant.

6. Rotary shaft seal according to claim 1 characterised in that a third diaphragm body is provided inside the first diaphragm body and has a sealing diaphragm, whose sealing lip is in contact with the shaft and inclined away from the pressure direction.

7. Rotary shaft seal according to claim 6, characterised in that the sealing diaphragm of the third diaphragm body is supported on the unpressurised side of the support element.

8. Rotary shaft seal according to claim 7, characterised in that the sealing diaphragm of the third diaphragm body is angled on the outer, radial edge to form an axial leg, which rests against the pressure side of the first diaphragm body.

9. Rotary shaft seal according to claim 8, characterised in that the axial leg of the third diaphragm body is fitted into the first diaphragm body, or in the axial leg of the support element.

10. Rotary shaft seal according to claim 6 characterised in that the sealing lip of the third diaphragm body rests against the shaft without pressure.

11. Rotary shaft seal with a first diaphragm body, which has a first sealing diaphragm with a first sealing lip that is in tight contact with a shaft and inclined against the pressure direction, and which is mounted on a support element and supported on the unpressurised side by a pressure mount, and a second diaphragm body, which has a second sealing diaphragm that is located at a distance from the first sealing diaphragm in the pressure direction and has a second sealing lip resting against the shaft and inclined against the pressure direction, and into which are inserted the support element with the first diaphragm body, as well as the pressure mount on the unpressurised side, where the support element supports the second sealing diaphragm and the pressure mount is held in place axially between the first diaphragm body and the inward-facing encompassing edge of the second diaphragm body, characterised in that a third diaphragm body is provided inside the first diaphragm body and has a sealing diaphragm, whose sealing lip is in contact with the shaft and inclined away from the pressure direction.

12. Rotary shaft seal according to claim 11, characterised in that the support element is designed as an angle ring, whose radial leg faces the second sealing diaphragm.

13. Rotary shaft seal according to claim 11, characterised in that the pressure mount is of disk-shaped design.

14. Rotary shaft seal according to claim 11, characterised in that the first and/or second sealing diaphragm is made of an elastomeric material containing particles of a lubricating solid.

15. Rotary shaft seal according to claim 14, characterised in that the particles consist of graphite or PTFE.

16. Rotary shaft seal according to claim 11, characterised in that the space between the two sealing diaphragms is filled with a lubricant.

17. Rotary shaft seal according to claim 11, characterised in that the sealing diaphragm of the third diaphragm body is supported on the unpressurised side of the support element.

18. Rotary shaft seal according to claim 11, characterised in that the sealing diaphragm of the third diaphragm body is angled on the outer, radial edge to form an axial leg, which rests against the pressure side of the first diaphragm body.

19. Rotary shaft seal according to claim 18, characterised in that the axial leg of the third diaphragm body is fitted into the first diaphragm body, or in the axial leg of the support element.

20. Rotary shaft seal according to claim 11, characterised in that the sealing lip of the third diaphragm body rests against the shaft without pressure.

* * * * *

UNITED STATES PATENT AND TRADEMARK OFFICE
CERTIFICATE OF CORRECTION

PATENT NO. : 6,736,403 B2
DATED : May 18, 2004
INVENTOR(S) : Kreutzer

It is certified that error appears in the above-identified patent and that said Letters Patent is hereby corrected as shown below:

Title page,
Item [75], Inventor, please change the address from "Onionsingel" to -- Orionsingel --.

Signed and Sealed this

Twenty-second Day of March, 2005

JON W. DUDAS
*Director of the United States Patent and Trademark Office*